United States Patent
Yaney et al.

(10) Patent No.: US 7,307,512 B2
(45) Date of Patent: Dec. 11, 2007

(54) POWER LINE COUPLING DEVICE AND METHOD OF USE

(75) Inventors: David Stanley Yaney, Poolsville, MD (US); William O. Radtke, Ellicott City, MD (US)

(73) Assignee: Current Technologies, LLC, Germantown, MD (US)

(*) Notice: Subject to any disclaimer, the term of this patent is extended or adjusted under 35 U.S.C. 154(b) by 257 days.

(21) Appl. No.: 11/117,498

(22) Filed: Apr. 29, 2005

(65) Prior Publication Data
US 2006/0244571 A1 Nov. 2, 2006

(51) Int. Cl.
*G05B 11/01* (2006.01)

(52) U.S. Cl. .............. 340/310.18; 340/310.11; 333/101

(58) Field of Classification Search ........ 340/310.11–310.18; 333/24 R, 101
See application file for complete search history.

(56) References Cited

U.S. PATENT DOCUMENTS

| | | | |
|---|---|---|---|
| 1,547,242 A | 7/1925 | Strieby | 385/100 |
| 2,577,731 A | 12/1951 | Berger | 179/2.5 |
| 3,369,078 A | 2/1968 | Stradley | 179/2.5 |
| 3,696,383 A | 10/1972 | Oishi et al. | 340/310 |
| 3,701,057 A | 10/1972 | Hoer | 333/10 |
| 3,702,460 A | 11/1972 | Blose | 340/150 |
| 3,810,096 A | 5/1974 | Kabat et al. | 348/147 R |
| 3,846,638 A | 11/1974 | Wetherell | 307/3 |
| 3,895,370 A | 7/1975 | Valentini | 340/310 A |
| 3,942,170 A | 3/1976 | Whyte | 340/310 R |
| 3,962,547 A | 6/1976 | Pattantyus-Abraham | 179/2.5 R |
| 4,004,110 A | 1/1977 | Whyte | 179/170 |
| 4,016,429 A | 4/1977 | Vercellotti et al. | 307/149 |
| 4,057,793 A | 11/1977 | Johnson et al. | 340/310 R |
| 4,142,178 A | 2/1979 | Whyte et al. | 340/310 R |

(Continued)

FOREIGN PATENT DOCUMENTS

DE 100 12 235 C2 12/2001

(Continued)

OTHER PUBLICATIONS

"Centralized Commercial Building Applications with the Lonworks® PLT-21 Power Line Transceiver", *Lonworks Engineering Bulletin*, Echelon, (Apr. 1997), 1-22.

(Continued)

*Primary Examiner*—Phung T. Nguyen
(74) *Attorney, Agent, or Firm*—Mel Barnes; Capital Legal Group, LLC

(57) ABSTRACT

The coupler of the present invention couples data signals, such as broadband RF signals, to and from a power line. The coupler of one embodiment that is for use with overhead power lines includes a length of URD MV cable with the neutral conductor removed. Each end of the URD cable is communicatively coupled to the MV power line conductor a predetermined distance from other. The distance between the two connections points on the MV may be related to the wavelength of a carrier frequency used to communicate the data signals. The URD cable may also form part of a transformer to permit the passage of data signals while preventing the flow of the high voltage power signals through the coupler. The neutral semi-conductive jacket of the URD cable may be coupled to ground via a low frequency conductive path.

35 Claims, 5 Drawing Sheets

U.S. PATENT DOCUMENTS

| | | | |
|---|---|---|---|
| 4,188,619 A | 2/1980 | Perkins | 340/310 R |
| 4,254,402 A | 3/1981 | Perkins | 340/310 R |
| 4,263,549 A | 4/1981 | Toppeto | 324/127 |
| 4,323,882 A | 4/1982 | Gajjer | 340/310 R |
| 4,383,243 A | 5/1983 | Krügel et al. | 340/310 R |
| 4,433,284 A | 2/1984 | Perkins | 355/30 |
| 4,481,501 A | 11/1984 | Perkins | 340/310 R |
| 4,569,045 A | 2/1986 | Schieble et al. | 370/45 |
| 4,636,771 A | 1/1987 | Ochs | 340/310 CP |
| 4,652,855 A | 3/1987 | Weikel | 340/310 A |
| 4,668,934 A | 5/1987 | Shuey | 340/310 A |
| 4,675,648 A | 6/1987 | Roth et al. | 340/310 A |
| 4,686,382 A | 8/1987 | Shuey | 307/149 |
| 4,697,166 A | 9/1987 | Warnagiris et al. | 340/310 R |
| 4,724,381 A | 2/1988 | Crimmins | 324/127 |
| 4,745,391 A | 5/1988 | Gajjar | 340/310 A |
| 4,746,897 A | 5/1988 | Shuey | 340/310 R |
| 4,890,089 A | 12/1989 | Shuey | 340/310 A |
| 4,973,940 A | 11/1990 | Sakai et al. | 340/310 R |
| 5,210,519 A | 5/1993 | Moore | 340/310 R |
| 5,257,006 A | 10/1993 | Graham et al. | 340/310 R |
| 5,351,272 A | 9/1994 | Abraham | 378/38 |
| 5,485,040 A | 1/1996 | Sutterlin | 307/3 |
| 5,497,142 A | 3/1996 | Chaffanjon | 340/310.02 |
| 5,537,087 A | 7/1996 | Naito | 336/92 |
| 5,559,377 A | 9/1996 | Abraham | 307/104 |
| 5,592,354 A | 1/1997 | Nocentino, Jr. | 361/69 |
| 5,625,863 A | 4/1997 | Abraham | 455/3.3 |
| 5,684,450 A | 11/1997 | Brown | 340/310.02 |
| 5,694,108 A | 12/1997 | Shuey | 340/310.01 |
| 5,705,974 A | 1/1998 | Patel et al. | 340/310.08 |
| 5,717,685 A | 2/1998 | Abraham | 370/30 |
| 5,770,996 A | 6/1998 | Severson et al. | 340/310.08 |
| 5,818,127 A | 10/1998 | Abraham | 307/106 |
| 5,850,114 A | 12/1998 | Froidevaux | 307/105 |
| 5,856,776 A | 1/1999 | Armstrong et al. | 340/310.01 |
| 5,864,284 A | 1/1999 | Sanderson et al. | 340/310.01 |
| 5,892,430 A | 4/1999 | Wiesman et al. | 340/310.01 |
| 5,929,750 A | 7/1999 | Brown | 340/310.02 |
| 5,933,071 A | 8/1999 | Brown | 340/310.01 |
| 5,933,073 A | 8/1999 | Shuey | 340/310.07 |
| 5,949,327 A | 9/1999 | Brown | 340/310.01 |
| 5,994,998 A | 11/1999 | Fisher et al. | 340/310.01 |
| 6,014,386 A | 1/2000 | Abraham | 378/485 |
| 6,023,106 A | 2/2000 | Abraham | 307/3 |
| 6,040,759 A | 3/2000 | Sanderson | 340/310.01 |
| 6,104,707 A | 8/2000 | Abraham | 370/295 |
| 6,140,911 A | 10/2000 | Fisher et al. | 340/310.01 |
| 6,144,292 A | 11/2000 | Brown | 340/310.02 |
| 6,172,597 B1 | 1/2001 | Brown | 340/310.02 |
| 6,255,935 B1 | 7/2001 | Lehmann et al. | 340/319.07 |
| 6,282,405 B1 | 8/2001 | Brown | 455/6.1 |
| 6,297,730 B1 | 10/2001 | Dickinson | 340/310.01 |
| 6,396,392 B1 | 5/2002 | Abraham | 340/310.01 |
| 6,407,987 B1 | 6/2002 | Abraham | 370/295 |
| 6,452,482 B1 | 9/2002 | Cern | 340/310.01 |
| 6,515,485 B1 | 2/2003 | Bullock et al. | 324/601 |
| 6,624,745 B1 | 9/2003 | Willer | 340/310.01 |
| 6,646,447 B2 | 11/2003 | Cern et al. | 340/539 |
| 6,683,531 B2 | 1/2004 | Diamanti et al. | 340/310.03 |
| 6,686,832 B2 | 2/2004 | Abraham | 340/310.01 |
| 6,753,742 B2 | 6/2004 | Kim et al. | 333/24 R |
| 6,785,532 B1 | 8/2004 | Rickard | 455/402 |
| 6,809,633 B2 | 10/2004 | Cern | 340/310.07 |
| 6,844,810 B2 | 1/2005 | Cern | 340/310.07 |
| 6,922,135 B2 | 7/2005 | Abraham | 340/310.07 |
| 6,933,835 B2 | 8/2005 | Kline | 340/310.05 |
| 6,950,567 B2 | 9/2005 | Kline | 340/310.06 |
| 6,958,680 B2 | 10/2005 | Kline | 385/15 |
| 6,965,302 B2 | 11/2005 | Mollenkopf et al. | 340/310.01 |
| 6,965,303 B2 | 11/2005 | Mollenkopf | 340/310.01 |
| 6,975,210 B2 | 12/2005 | Cern | 340/310.01 |
| 6,980,089 B1 | 12/2005 | Kline | 340/310.01 |
| 6,980,090 B2 | 12/2005 | Mollenkopf | 340/310.01 |
| 6,982,611 B2 | 1/2006 | Cope | 333/101 |
| 6,998,962 B2 | 2/2006 | Cope et al. | 340/310.01 |
| 7,042,351 B2 | 5/2006 | Kline | 340/538 |
| 7,046,124 B2* | 5/2006 | Cope et al. | 375/258 |
| 7,046,882 B2 | 5/2006 | Kline | 385/100 |
| 7,061,370 B2 | 6/2006 | Cern | |
| 7,102,478 B2 | 9/2006 | Pridmore et al. | 336/176 |
| 7,132,819 B1* | 11/2006 | Cope et al. | 323/282 |
| 7,224,243 B2 | 5/2007 | Cope | 333/100 |
| 2001/0038329 A1 | 11/2001 | Diamanti et al. | 340/310.01 |
| 2001/0052843 A1 | 12/2001 | Wiesman et al. | 340/310.01 |
| 2001/0054953 A1 | 12/2001 | Kline | 340/310.01 |
| 2002/0002040 A1 | 1/2002 | Kline et al. | 455/402 |
| 2002/0097953 A1 | 7/2002 | Kline | 385/24 |
| 2002/0105413 A1 | 8/2002 | Cern et al. | 340/310.01 |
| 2002/0109585 A1 | 8/2002 | Sanderson | 340/310.01 |
| 2002/0110310 A1 | 8/2002 | Kline | 385/15 |
| 2002/0110311 A1 | 8/2002 | Kline | 385/15 |
| 2002/0118101 A1 | 8/2002 | Kline | 340/310.01 |
| 2002/0121963 A1 | 9/2002 | Kline | 340/310.01 |
| 2002/0154000 A1 | 10/2002 | Kline | 340/310.01 |
| 2002/0171535 A1 | 11/2002 | Cern | 370/208 |
| 2003/0054793 A1 | 3/2003 | Manis et al. | 455/402 |
| 2003/0160684 A1 | 8/2003 | Cern | 340/310.01 |
| 2003/0169155 A1 | 9/2003 | Mollenkopf et al. | 340/310.01 |
| 2003/0201759 A1 | 10/2003 | Cern | 323/247 |
| 2003/0201873 A1 | 10/2003 | Cern | 340/310.07 |
| 2003/0210135 A1 | 11/2003 | Cern | 340/310.07 |
| 2003/0222747 A1 | 12/2003 | Perkinson et al. | 336/178 |
| 2003/0222748 A1 | 12/2003 | Cern et al. | 336/178 |
| 2003/0232599 A1 | 12/2003 | Dostert | 455/166.1 |
| 2003/0234713 A1 | 12/2003 | Pridmore, Jr. et al. | 336/82 |
| 2004/0003934 A1* | 1/2004 | Cope | 174/36 |
| 2004/0032320 A1 | 2/2004 | Zalitzky et al. | 340/310.01 |
| 2004/0056734 A1 | 3/2004 | Davidow | 333/100 |
| 2004/0090284 A1 | 5/2004 | Cern | 333/24 R |
| 2004/0104798 A1 | 6/2004 | Cern | 336/174 |
| 2004/0110483 A1 | 6/2004 | Mollenkopf | 455/402 |
| 2004/0113756 A1 | 6/2004 | Mollenkopf | 340/310.01 |
| 2004/0113757 A1 | 6/2004 | White, II et al. | 340/310.01 |
| 2004/0135676 A1 | 7/2004 | Berkman et al. | 340/310.01 |
| 2004/0142599 A1* | 7/2004 | Cope et al. | 439/620 |
| 2004/0183619 A1 | 9/2004 | Sugg | 333/24 R |
| 2004/0196144 A1 | 10/2004 | Crenshaw et al. | 340/310.01 |
| 2004/0223617 A1 | 11/2004 | Corcoran et al. | 380/266 |
| 2004/0227621 A1 | 11/2004 | Cope et al. | 340/310.01 |
| 2004/0227622 A1 | 11/2004 | Giannini et al. | 340/310.01 |
| 2005/0046550 A1 | 3/2005 | Crenshaw et al. | 340/310.01 |
| 2005/0077868 A1 | 4/2005 | Cern | 320/108 |
| 2005/0122092 A1 | 6/2005 | Blasco Claret et al. | 232/329 |
| 2005/0164666 A1 | 7/2005 | Lang et al. | 455/282 |
| 2005/0168326 A1 | 8/2005 | White et al. | 340/310.01 |
| 2005/0194944 A1 | 9/2005 | Folts et al. | 323/209 |
| 2006/0036388 A1 | 2/2006 | Swarztrauber | 702/107 |
| 2006/0044076 A1 | 3/2006 | Law | 333/124 |
| 2006/0079198 A1 | 4/2006 | Sanderson | 455/402 |
| 2006/0082219 A1 | 4/2006 | Gerszberg et al. | 307/1 |
| 2006/0087382 A1 | 4/2006 | Cern | 333/24 R |

FOREIGN PATENT DOCUMENTS

| | | |
|---|---|---|
| DE | 101 03 530 A1 | 8/2002 |
| DE | 101 19 039 A1 | 12/2002 |
| DE | 101 19 040 A1 | 12/2002 |
| EP | 0 470 185 B1 | 11/1995 |
| EP | 0 913 955 A2 | 5/1999 |
| EP | 0 948 143 A2 | 10/1999 |
| EP | 0 959 569 A1 | 11/1999 |
| EP | 0 916 194 B1 | 9/2001 |
| EP | 1 213 849 A1 | 6/2002 |

| | | | |
|---|---|---|---|
| GB | 2 331 683 A | 5/1999 | |
| GB | 2 341 776 A | 3/2000 | |
| JP | 1276933 | 11/1989 | |
| WO | WO-92/16920 A1 | 10/1992 | |
| WO | WO-98/33258 A2 | 7/1998 | |
| WO | WO-00/59076 A1 | 10/2000 | |
| WO | WO-00/60701 A1 | 10/2000 | |
| WO | WO-01/08321 A1 | 2/2001 | |
| WO | WO-01/43305 A1 | 6/2001 | |
| WO | WO-03/034608 A2 | 4/2003 | |
| WO | WO-03/040732 A2 | 5/2003 | |
| WO | WO-2004/021600 A1 | 3/2004 | |

OTHER PUBLICATIONS

"Demand Side Management with LONWORKS® Power Line Transceivers", *LONWORKS Engineering Bulletin*, (Dec. 1996),1-36.

"EMETCON Automated Distribution System", *ABB Power T & D Company, Inc*, (Jan. 1990),1-14.

"IEEE Guide for Power-Line Carrier Applications, ANSI/IEEE Std 643-1980", *The Institute of Electrical and Electronics Engineers, Inc.*, (1980), 1-80.

"Intellon Corporation Test Summary for Transformerless Coupler Study", *Intellon No News Wires*, DOT/NHTSA Order No. DTNH22-98-P-07632, (Dec. 24, 1998),1-18.

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992),1-11.

"Summary of an IEEE Guide for Power-Line Carrier Applications", *IEEE Transactions on Power Apparatus and Systems*, (Nov./Dec. 1980),2334-2337.

"White Paper on Medium Voltage Powerline Communication (PLC) Networks", *CIGRE SC D2 WG 14, Broadband PLC*, (Mar. 2005),1-58.

"White Paper on Medium Voltage Powerline Communication (PLC) Networks Annexes", *CIGRE SC D2 WG 14, Broadband PLC*, (Apr. 2005),1-15.

Abraham, K C., et al., "A Novel High-Speed PLC Communication Modem", *IEEE Transactions on Power Delivery*, (Oct. 1992),1760-1768.

Barstow, J M., "A Carrier Telephone System for Rural Service", *AIEE Transactions*, (1947),301-307.

Chang, SS L., "Power-Line Carrier", *Fundamentals Handbook of Electrical and Computer Engineering, vol. II-Communication, Control, Devices and Systems*, (1983),617-627.

Coakley, N G., et al., "Real-Time Control of a Servosytem Using the Inverter-Fed Power Lines to Communicate Sensor Feedback", *IEEE Transactions on Industrial Electronics*, (1999),360-369.

Hasler, E F., et al., "Communication Systems Using Bundle Conductor Overhead Power Lines", *IEEE Transactions on Power Apparatus and Systems*, (Mar./Apr. 1975),344-349.

Horiguchi, Akira , "High Speed Power Line Communication Technology", *Mitsubishi Electric Advance vol. 109*, (Mar. 2005),1-27.

Lim, C K., et al., "Development of a Test Bed for High-Speed Power Line Communications", *School of Electrical and Electronic Engineering*, Nanyang Technological University, Singapore, IEEE, (2000),451-456.

Liu, E , et al., "Broadband Characterization of Indoor Powerline Channel", *Communications Laboratory*, Helsinki University of Technology, Finland presented at the 2004 International Symposium on PowerLine Communications and its Applications, Zaragoza, Spain, (Mar. 31-Apr. 2, 2004).

Naredo, J L., et al., "Design of Power Line Carrier Systems on Multitransposed Delta Transmission Lines", *IEEE Transactions on Power Delivery*, (1991),952-958.

\* cited by examiner

POWER LINE COUPLING DEVICE AND METHOD OF USE

FIELD OF THE INVENTION

The present invention relates, generally, to power line coupling devices and in particular, to a coupler for coupling data signals to and from electric utility lines such as medium voltage underground cables and overhead wires.

BACKGROUND OF THE INVENTION

Well-established power distribution systems exist throughout most of the United States, and other countries, that provide power to customers via power lines. With some modification, the infrastructure of the existing power distribution systems can be used to provide data communication in addition to power delivery, thereby forming a power distribution communication system. In other words, existing power lines that already have been run to many homes and offices can be used to carry data signals to and from the homes and offices. These data signals are launched or retrieved from the power lines at various points in the power distribution communication system, such as, for example, near homes, offices, Internet service providers, and the like.

While the concept may sound simple, there are many challenges to overcome in order to use power lines for data communication. Power distribution systems include numerous sections, which operate at different voltages. The transition from one section to another typically is accomplished with a transformer. The sections of the power line distribution system that are connected to the customers typically are low voltage (LV) sections having a voltage between about 100-800 volts, depending on the system. In the United States, the low voltage section typically operates with two legs each 120 volts above ground The sections of the power distribution system that provide the power to the low voltage sections are referred to as the medium voltage (MV) sections. The voltage of the MV section is in the range of 1,000 Volts to 100,000 volts and typically 7.6 kilovolts (kV) to neutral (13.2 kV between phase conductors). The transition from the MV section to the LV section of the power distribution system typically is accomplished with a distribution transformer, which converts the higher voltage of the MV section to the lower voltage of the LV section.

Power system transformers are one obstacle to using MV or LV power distribution lines for data communication. Transformers are designed for conversion of power at low frequencies (i.e. 50 or 60 Hz) and present complex and usually undesirable series and shunt impedances that can be detrimental to data signals at higher frequencies useful for communications. As such, power distribution communication systems face the challenge of passing the data signals around (or sometimes through) the distribution transformers.

To communicate data signals over the medium voltage power lines, the system needs a method of coupling to and from those lines. As discussed, medium voltage power lines may operate from about 1000 V to about 100 kV, and can deliver large amounts of energy. Consequently, coupling to a medium voltage power line gives rise to safety concerns for the persons installing the coupling device.

The coupling device should be designed to provide safe and reliable communication of data signals with a medium or high voltage power line—carrying both low and high current—in all outdoor environments such as extreme heat, cold, humidity, rain, wind, high shock, and high vibration. Also, coupling around the distribution transformer—such as in transformer bypass systems—raises concern that dangerous MV voltage levels may be inadvertently conducted to the customer premises on the low voltage power line, which the coupling device should prevent. In addition, a coupling device should be designed so that it does not significantly compromise the signal-to-noise ratio and facilitates bi-directional communication. In addition, the coupling device (or coupler as referred to herein) should enable the transmission and reception of broadband radio frequency (RF) signals used for data transmission on MV lines Various embodiments of the coupler of the present invention may provide many of the above features and overcome the disadvantages of the prior art.

SUMMARY OF THE INVENTION

The coupler of the present invention couples data signals, such as broadband RF signals, to and from a power line. The coupler of one embodiment that is for use with overhead power lines includes a length of underground residential distribution (URD) MV cable with the outer jacket and neutral conductors removed. Each end of the URD cable may be communicatively coupled to the same MV power line conductor a predetermined distance apart. The distance between the two connection points on the MV power line may be related to the wavelength of the radio frequency energy used to communicate the data signals. The URD cable may also form part of an isolation transformer to permit the passage of data signals while preventing the flow of the high voltage power signals through the coupler. The semi-conductive jacket of the URD cable may also be coupled to ground via a low frequency conductive path.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

The coupler of the present invention may be used in a transformer bypass device, a backhaul point, a repeater, or at any location at which it is desirable to couple data signals to and/or from a power line—especially medium and high voltage power lines or other power lines where electrical isolation from the power signal is necessary. The present invention may be used to communicate data signals with (i.e., couple data signals to and/or from) both underground and overhead power lines.

Figure 1:
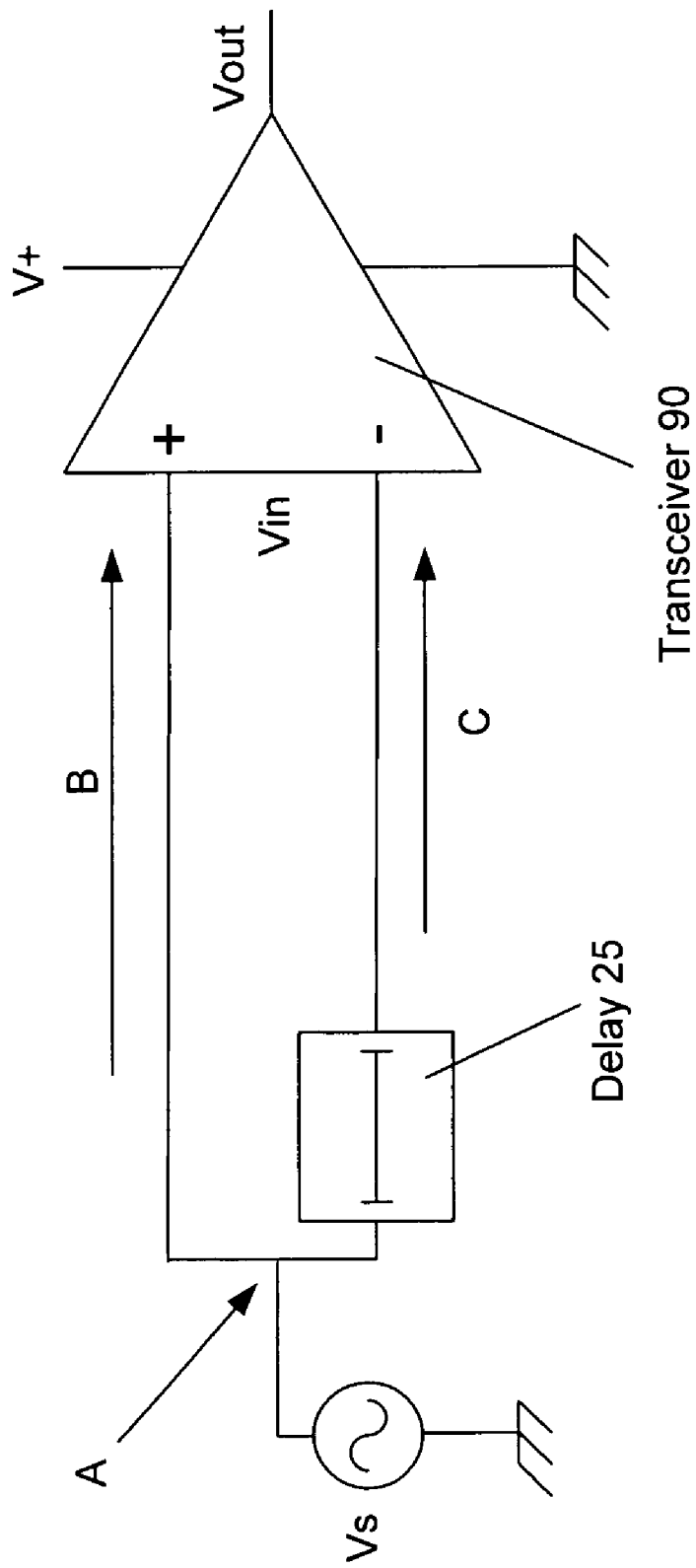
FIG. 1 is an illustration depicting the principles of some example embodiments of the present invention.

FIG. 1 depicts a schematic of an embodiment of the present invention. As shown in FIG. 1, the data signals from source Vs split at point A and traverse down path B and path C toward transceiver 90 (whose gain equals one for the purposes of this description). Path C includes a delay 25 of time T1 that delays the arrival of the signal Vs at the negative input terminal of the transceiver 90. (Note: Vs generally refers to the peak voltage of the voltage source, as opposed to the peak to peak voltage.) Thus, the signal Vs will arrive at the positive terminal of the transceiver 90 at time T1 before the signal Vs arrives at the negative terminal of the receiver, wherein the time T1 is equal to the delay caused by delay 25. If the delay 25 causes a delay of time T1 that is substantially equal to one half of the period of a carrier signal modulated by the data signal, the transceiver 90 will see a voltage difference between its positive and negative terminals, and deliver an output voltage, that approximates twice Vs. Alternately, if the delay 25 causes a delay of time T1 that is substantially equal to one quarter of the period of the carrier signal modulated by the data signal, the transceiver 90 will deliver an output voltage that approximates Vs multiplied by the square root of two.

The delay 25 may be implemented in any suitable manner. One method of adding a delay to a signal path is to increase the distance the signal must travel. Thus, one method of implementing such a delay is to construct the conductor of path C so that it is longer than conductor of path B by a distance equal to the portion of the wavelength for which a delay is desired. Thus, the data can be transmitted and received by transmitting the data signal through two data paths from a single source or location, adding a delay to one path, and differentially receiving the signal from the two paths. If the delay for a given signal along one path is not ideal (e.g., is much less than the period), the differential voltage at the transceiver terminals may be smaller than Vs thereby resulting in an apparent coupling loss. However, as discussed below, depending on numerous factors some coupling loss may be tolerable or even desirable.

Figure 2:
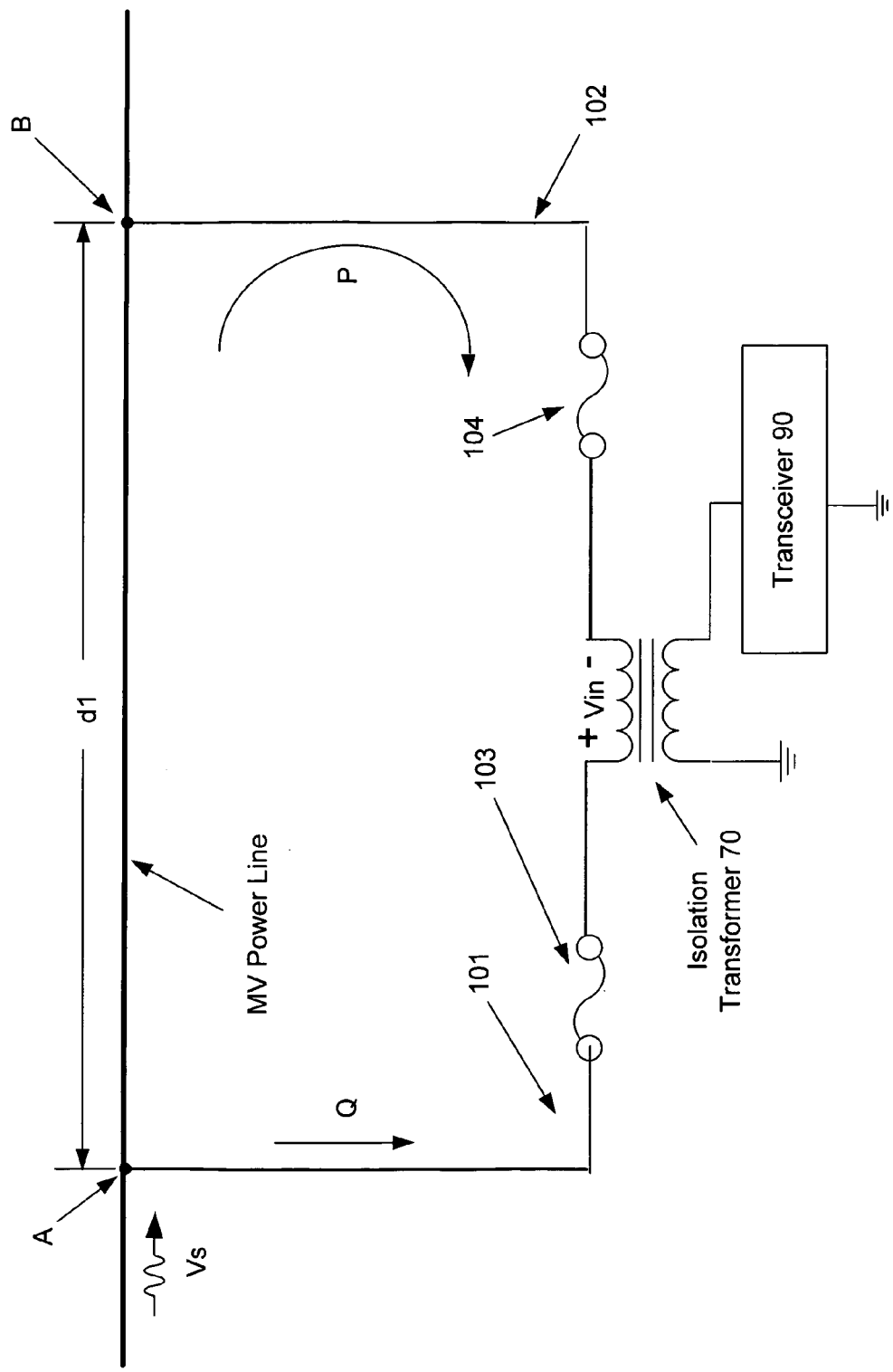
FIG. 2 is a schematic of an example embodiment of a coupler according to the present invention.

FIG. 2 provides a schematic of an example embodiment of the present invention. As shown in the FIG. 2, the transceiver 90 may be connected to an isolation transformer 70, which is attached to the medium voltage power line via conductors 101 and 102. The conductors 101 and 102 are connected to the MV power line a distance d1 from each other. For ease of understanding, operation of this embodiment will be described in the context of coupling a data signal modulated on a single carrier frequency. In practice, however, the coupler may be used to communicate data signals using a plurality of carrier frequencies such as an OFDM signal, CDMA signal, or other spread spectrum signal. In this embodiment, the data signals are communicated using substantially sinusoidal carriers, while other embodiments may use different carriers.

As shown in FIG. 2, this embodiment includes a isolation transformer 70. As is known in the art, current flowing through one winding of the transformer will induce a current and voltage in the other winding of the transformer. In this embodiment, the primary of the isolation transformer 70 is connected to the MV power line and the secondary of the transformer 70 is connected to the transceiver 90. However, other embodiments may employ other types of isolation devices such as capacitive (e.g., a pair of capacitors connected to a transceiver).

In this example, the data signals (Vs) are transmitted down the MV power line from the left in the figure as indicated by the arrow Vs. As the data signals Vs traverse the MV power line, different locations on the MV power line will be at different voltage potentials due to the propagation of the data signal down the MV power line.

In this example embodiment, the energy of the data signal will propagate down the MV power line until it reaches point A—the first connection point of the coupler to the MV power line. At point A, a portion of the energy of the data signals will propagate into the coupler along conductor 101 and path Q to the positive terminal of isolation transformer 70. In addition, when the data signals reach point A, a second portion of the energy of the data signals will continue propagating down the MV power line until reaching point B—the second connection point of the coupler to the MV power line. At point B, a portion of the remaining energy of the data signals will propagate into the coupler along conductor 102 and path P to the negative terminal of isolation transceiver 70. A third portion of the energy of the data signal may be reflected back by the real and present impedance discontinuity created by the junction at point A. This reflected power may contribute to both the insertion loss and the through loss of the coupler, because none of that power reaches the transceiver 90, nor travels past the coupler.

As is illustrated in the figure, the data signals traversing along path P must traverse a longer distance to reach the isolation transformer 70 than the data signals traveling along path Q. Specifically, in this example embodiment conductors 101 and 102 that connect the coupler to the power line may be substantially the same length. Consequently, the additional distance that the data signals traverse along path P is substantially equal to the distance between connections points A and B. Thus, in this embodiment, the closer that the distance between the connection points A and B can approximate a half of a wavelength of the carrier used to communicate the data signals, the closer the received signal will approximate twice Vs (i.e., twice Vs at connection point A). As will be evident to those skilled in the art, Vs at point A may be less than the voltage transmitted from the transmitter due to the attenuation of the signal prior to it reaching point A.

The current in the primary winding will induce a voltage across the secondary winding that corresponds to the data signal, which may then be received and processed by the transceiver 90. In this embodiment, both conductors 101 and 102 include a fuse (fuse 103 and 104) to ensure safety of personnel in the event a fault occurs. The fuse may be designed or selected to have a predetermined or minimum resistance of at least 0.5 ohms, 1 ohm, 1.5 ohms, 2 ohms, or 3 ohms and thereby limit the low frequency AC bypass current through the coupler. This characteristic acts to prevent downstream faults on the MV wiring from blowing upstream fuses unnecessarily, which may be most applicable to three phase Wye-connected systems with neutral referenced to ground.

The coupler 100 of this embodiment is a passive, reciprocal device and, therefore, coupling of data signals onto the MV power line works in the same manner. Specifically, the transceiver 90 will transmit the data signals to the isolation transformer 70 resulting in a differential voltage Vin on the primary winding of the isolation transformer 70. The voltage Vin is conducted to the MV power line at connection points A and B. A portion of the power of the data signals may be transmitted in both directions on the MV power line away from the coupler 100. Specifically, when the data signal on conductor 102 reaches point B, it will be travel in both directions along the MV power line. When a portion of that energy reaches point A, it will be added to the energy of the data signals that reach point A by traveling along conductor 101. However, because the data signal that traverse conductor 102 was transmitted with substantially the same magnitude and with opposite polarity differentially and has traveled a greater distance to reach point A, its energy will not "cancel out" the data signals from conductor 101, but instead may increase the energy of the data signals traveling upstream (e.g., to the left in the figure).

As is illustrated in the figure, the data signals traversing along path P must traverse a longer distance to reach point A than the data signals traveling along path Q. Specifically, in this example embodiment conductors 101 and 102 that couple the coupler to the power line may be substantially the same length. Consequently, the additional distance that the data signals traverse along path P must travel is substantially equal to the distance between connections points A and B.

Thus, in this embodiment, the closer that the distance between the connection points A and B can approximate a half the wavelength of the carrier used to communicate the data signals, the closer the transmitted signal (at point A) may approximate twice Vin (i.e., twice Vin transmitted by isolation transformer 70) assuming equal length conductors 101, 102. As will be evident those skilled in the art, transmission and reception of data signals to and from the other direction on the MV power line will operate in substantially the same manner.

As discussed, the distance between the connection points A and B may be approximately one half of a wavelength of a carrier frequency used to communicate the data signals, or, in a system that uses multiple carrier frequencies, a half of a wavelength of the lowest carrier frequency or other carrier frequency. However, in some instances, depending on the frequencies used to communicate the data signals, a half (or even quarter) of a wavelength may be too great a distance to make the coupler economically feasible or to permit a practical installation.

Consequently, depending on the various factors, including but not limited to the quantity of power line noise, sensitivity of the receiver, and power of the data signals, it may be possible to make the distance between the connection points A and B less than one half or one quarter of a wavelength. In one example embodiment, the distance between the two connection point locations on the MV power (points A and B) preferably may be greater than five percent (5%), more preferably greater than seven and a half percent (7.5%), even more preferably greater than ten percent (10%), and still more preferably greater than twenty percent (20%) of the wavelength of a carrier frequency or of the lowest carrier frequency used to communicate the data signals. As is known to those skilled in the art, the wavelength is equal to the speed of propagation of the wave (which may approximate the speed of light) divided by its frequency. Thus, if the data signals are transmitted using carrier signals in the 30-50 Mhz band, the distance between the two connection points may preferably be greater than five percent (5%), more preferably greater than seven and a half percent (7.5%), even more preferably greater than ten percent (10%), and still more preferably greater than twenty percent (20%) of the wavelength of the 30 Mhz carrier signal (i.e., the lowest carrier frequency). Because the 30 Mhz carrier signal has a wavelength of less than 394 inches on the MV wire, the distance between the two connection points may preferably be greater than 19.6 inches (5%), more preferably greater than 29.4 inches (7.5%), even more preferably greater than 39.2 inches (10%), and still more preferably greater than 78.4 inches (20%). It will be recognized to those skilled in the art that if the frequency band of carriers is very wide, in comparison to the lowest carrier frequency, it may be desirable to set the distance between the connection points to be a quarter of a wavelength of a carrier near the middle of the frequency band.

Figure 3:
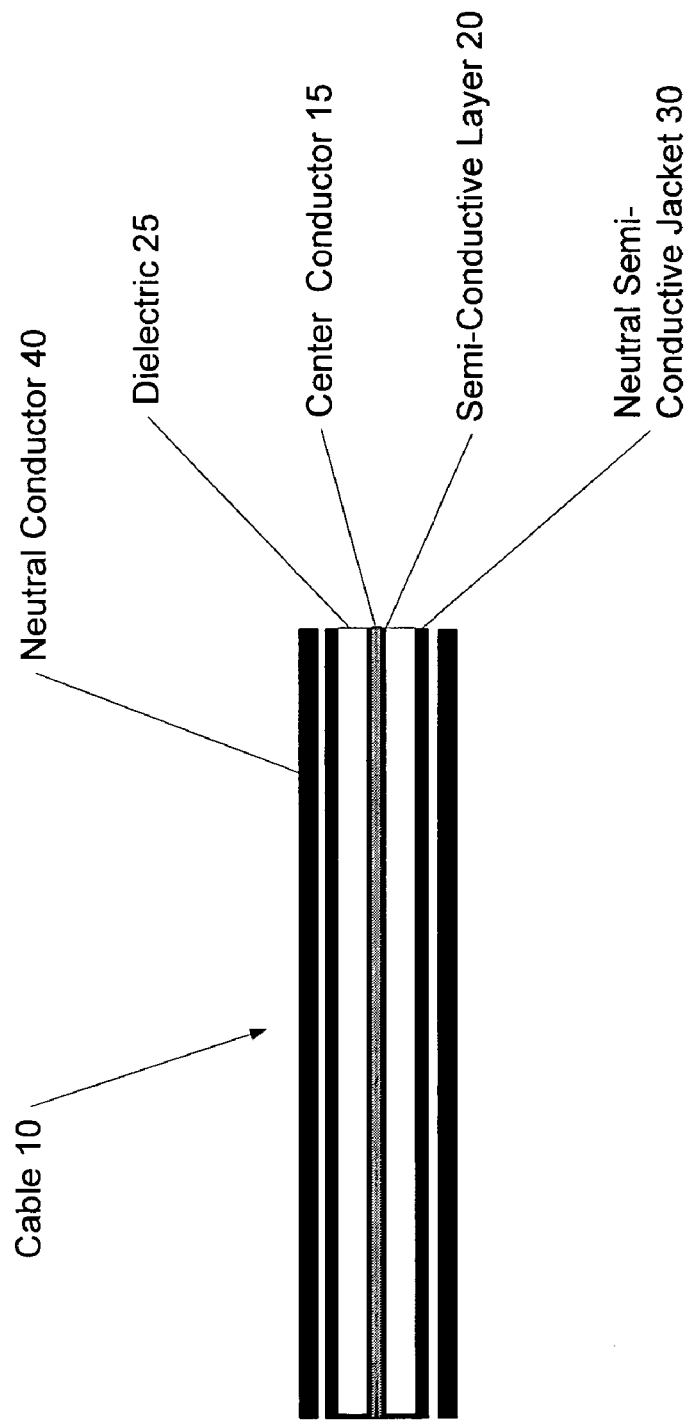
FIG. 3 is a cross sectional view of an example URD MV cable.

This example embodiment may be implemented using a length of underground residential distribution (URD) cable. As shown in FIG. 3, the URD MV cable 10 includes a center conductor 15 that carries the AC power signal. Surrounding the center conductor 15 is a semi-conductive layer 20. The semi-conductive layer 20 is surrounded by a dielectric 25 (i.e., an insulator). A neutral semi-conductive jacket 30 surrounds the dielectric 25. The neutral semi-conductive jacket 30 typically ensures, among other things, that ground potential and deadfront safety (the grounding of surfaces to which a lineman may be exposed) are maintained on the surface of the cable. Finally, a neutral conductor 40 surrounds the neutral semi-conductive jacket 30. Typically, modern cables have sixteen strands of number ten gauge copper wire or larger openly wrapped along the cable in a helix. Some URD MV cables, which may be used with or form part of the present invention, may include additional or fewer components than those identified herein.

Figure 4:
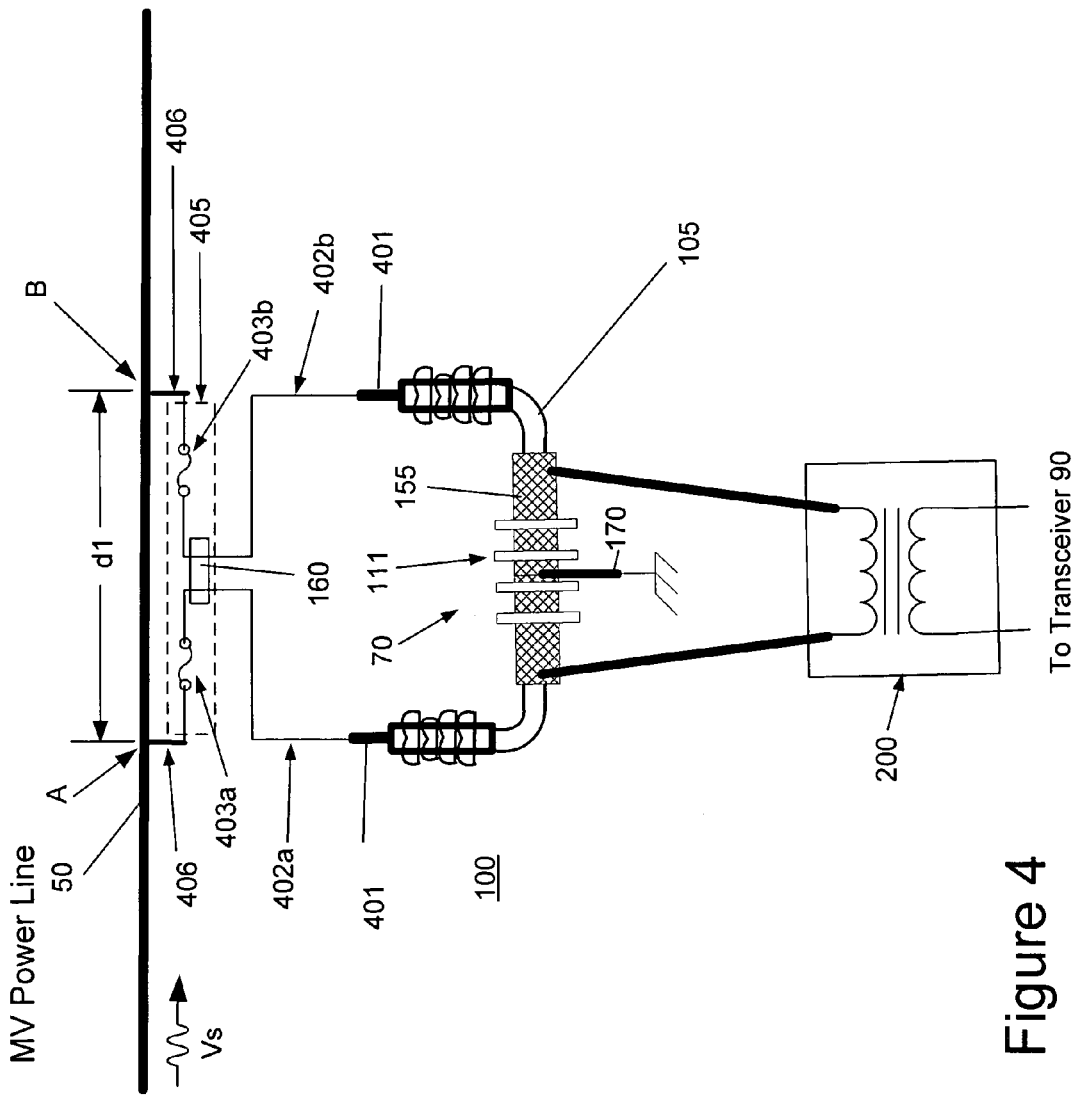
FIG. 4 is a illustration of an implementation of an example embodiment of a coupler according to the present invention.

Referring to FIG. 4, to couple signals to and from the overhead MV cable 50, the coupler 100 is formed with a length of URD MV cable 105, which may have a six gauge center conductor and insulation consistent with the operating voltage class of the MV be six gauge, eight kV cable. In this embodiment, the center conductor 15 of each end of the URD MV cable 105 is appropriately terminated with a connector 401 as is well-known to those skilled in the art. Each connector 401 is attached to a conductor 402. Both conductors 402a and 402b travel through the common mode choke 160, which in this embodiment may be one or more ferrite toroids. In addition, each conductor 402 may be wound around the toroid (or toroids) to thereby increase the impedance of the choke and reduce the number of toroids necessary. The conductors 402a and 402b are each connected to a fuse 403a and 403b, respectively. Furthermore, while the fuses 403 are shown on the MV power line side of the common mode choke 160, they may alternately be on the transformer 70 of the common mode choke 160.

The other side of the fuses 403a and 403b are connected to a conventional hot line clamp 406 via a conductor. As is shown in FIG. 4, the fuses 403a and 403b, the common mode choke 160, and a portion of conductors 402a and 402b may be housed in a housing 405. The housing 405 may be cylindrical with an opening on each end and an opening on one side (to allow conductors 402a and 402b to enter the housing 405). The opening on the ends of the housing 405 may permit the expulsion of energy should a fuse be faulted. The housing 405 may be attached to and supported on each end by a hot clamp 406 or via another bracket (not shown). The hot clamps 406, which may form the electrical and mechanical connection of the coupler 100 to the MV power line, may be spaced apart from each other approximately one half of a wavelength of a carrier used to communicate the data signals or by some other predetermined distance. The support of the fuses 403 by the housing 405 may alleviate the need for traditional fuse holding mechanisms (e.g., cut-outs) to thereby provide an economic advantage over other couplers.

The isolation transformer 70 in this embodiment, is formed of a length of URD MV cable 105, which has had the outer concentric neutral conductors removed. A tubular metal braid 155 is disposed around a portion of the URD cable 105. In this embodiment, the metal braid 155 extends substantially around the entire circumference of the URD cable 105 (or a portion of the length of cable 105) and may be one half inch in diameter and ten gauge.

In this embodiment the opposite ends of the metal braid 155 are electrically connected to opposite ends of the primary winding of transformer 200, which may provide impedance matching and further isolation. This connection may or may not be a direct connection (i.e., a transmission line of variable length, circuit networks or devices of some kind could be added therebetween to shape the signal spectrum or improve its data transmission characteristics). The leads from the metal braid 155 may be insulated to prevent shorting of the data signals.

In this embodiment, a magnetic core 111 may be disposed around the metal braid 155. The magnet core 111 may be formed by a plurality of magnetically permeable toroids (e.g., ferrite toroids) that are disposed external to the metal braid.

Thus, the isolation transformer 70 of this embodiment is comprised of a first winding, which is formed by the center conductor 10 of the URD cable 105. A second winding of the transformer 70 is formed by the metal braid 155. The metal braid 155 and the center conductor 10 of the URD cable 105 are isolated by the insulation (dielectric 25) of the URD cable 105. The core of the transformer is formed of the magnetic core 111, which in this embodiment includes a plurality of ferrite toroids that are disposed so as to be in communication with the magnetic flux created by the flow of data signals through the center conductor and the metal braid. Thus, both windings of this isolation transformer 70 are single turn windings. While the center conductor of the URD cable may be energized to the medium voltage, the metal braid 155 is insulated from these voltages by the insulation of the URD cable. Thus, only the data signals are coupled between the center conductor and the metal braid, thereby allowing safe reception and transmission of the data signals.

In this embodiment, the metal braid 155 may be connected to a ground pathway. As discussed above, with the neutral conductor 40 removed from the URD cable 105 of this embodiment, the neutral semi-conductive jacket 30 is the outer layer of the URD cable 105. Typically, the neutral conductor 40 of a URD cable grounds the AC power if and when it pierces the insulating layers of the cable. In this embodiment, if the medium voltage AC power were to pierce the insulating layers of the URD cable 105 (e.g., due to damage of the cable) the neutral semi-conductive jacket 30 would be energized to the voltage of the MV power line, which may be tens of thousands of volts. In addition, the neutral conductor 40 of a URD cable typically is used to ground leakage currents that reach the semi-conductive jacket 30. Thus, without a neutral conductor 40, leakage currents could energize the neutral semi-conductive jacket 30 to the voltage of the MV power line.

To maintain the voltage on the neutral semi-conductive jacket 30 at ground potential, the neutral semi-conductive jacket 30 may be connected to a ground pathway 170 that allows one or both fuses 403 to open if a fault occurs. Thus, if a fault occurs (e.g., significant current reaches the neutral semi-conductive jacket 30) the neutral semi-conductive jacket 30 of the URD cable 105 will conduct the current to the metal braids 155, which will conduct the current through the ground pathway 170 to ground allowing one or both fuses 403 to open. In addition, leakage currents that reach the neutral semi-conductive jacket 30 may also be conducted to ground through the ground pathway 170. The ground pathway 170 of this embodiment is a lead extending from a center tap of the magnetic core 11 to ground. In addition, the ground pathway 170 may include a data impedance, such as a high pass filter or inductor, that prevents the data signal from being shorted to ground through the ground pathway 170.

As discussed, opposite ends of the metal braid 155 may be electrically connected to opposite ends of the primary winding of the transformer 200. The secondary winding of the transformer 200 may be coupled to a boundary card (that includes a fuse and other circuitry for breaking the data cable should a fault occur) that is coupled to a connector. Thus, the second winding of the transformer 200 may be in communication with a transceiver (e.g., via the connector). The receiver portion of the transceiver may include an amplifier, filter, demodulator (e.g., a modem), and processor. The transmitter portion of the transceiver may include an amplifier, filter, modulator (e.g., the same or different modem as the receiver portion) and processor.

The coupler 100 operates as described above to couple signals to and from the MV power line. The data signals are transmitted on the overhead MV cable 50 in both directions along the MV power line. It should be noted that the figures herein are not drawn to scale and are for illustrative purposes. For example, the toroids that comprise the magnetic core 111 are preferably adjacent to each other, but shown spaced apart in the figures for illustrative purposes. Similarly, the metal braid 155 is shown mounted to the URD cable 105 in a location that substantially near the middle of the URD cable (and the coupler 100 data path). In other embodiments, the coupler may be closer to one of the stem connectors 401 than the other, which may be a design choice.

While not shown in the other figures, the magnetic core 111 and metal braid 155 are preferably packaged in an environmentally protective, insulative encasing and/or disposed in a protective housing. Similarly, the entire length of the URD MV cable 105 may be packaged in an environmentally protective, insulative material. Additionally, the coupler 100 may be mounted by attaching the housing 405 to the underside of the cross arm of the utility pole. Thus, each hot clamp 406 may be connected to the MV powerline 50 on opposite sides of the utility pole cross arm (and insulator). In addition, it may be desirable to provide a length of conductor between the hot clamps 406 and the ends of the housing 405 to permit more flexible installation and connection of the hot clamps 406.

Figure 5:
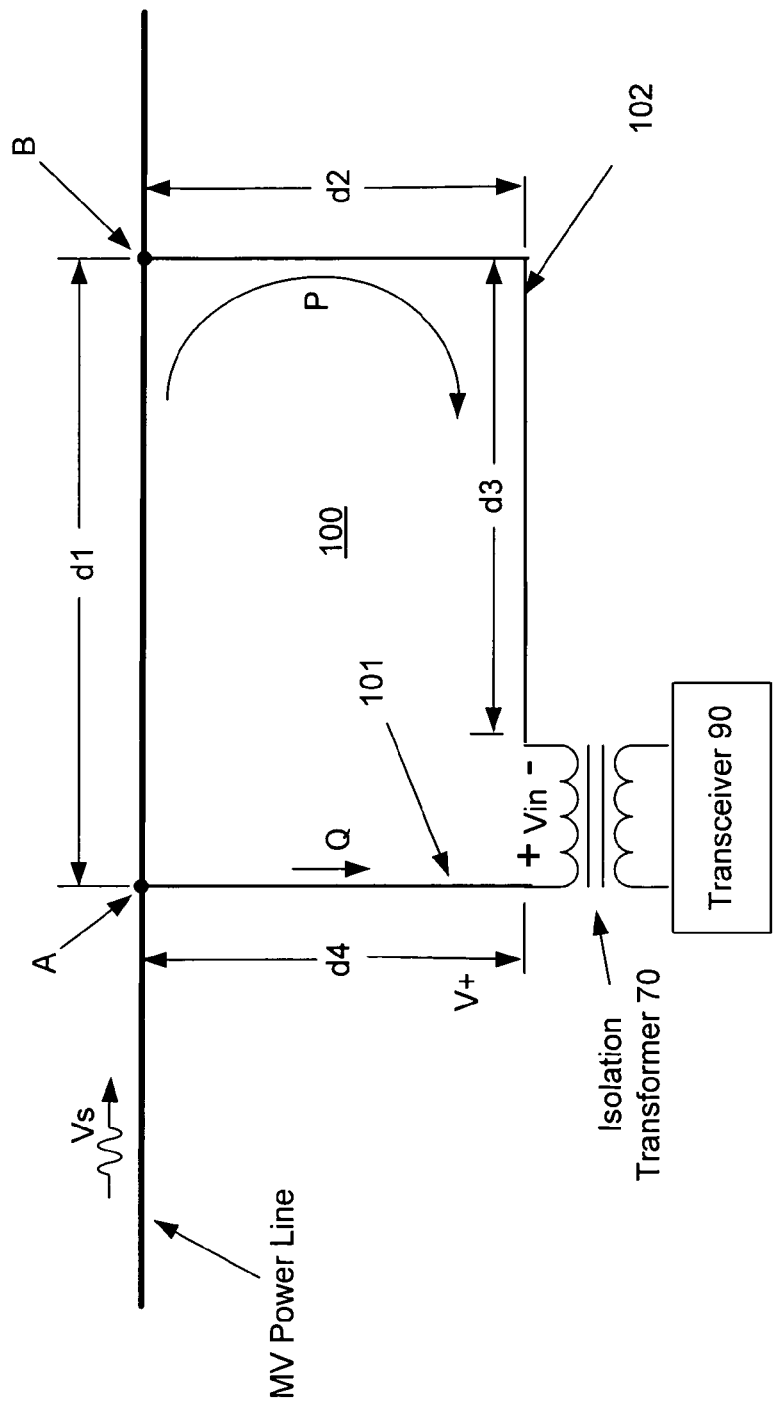
FIG. 5 is a schematic of another example embodiment of a coupler according to the present invention.

FIG. 5 illustrates another example of a coupler of the present invention. As shown in the figure, the coupler 100 is attached to the medium voltage power line via conductors 101 and 102. The conductors 101 and 102 are connected to the MV power line a distance d1 from each other. However, in contrast to the above embodiments, conductors 101 and 102 are not of equal length.

In this example, the data signals Vs are transmitted down the MV power line from the left in the figure as indicated by the arrow Vs. The data signal Vs will split at point A. A first portion of the signal (referred to as Signal Q and indicated by "Q" in the figure) will traverse through conductor 101 to the isolation transformer 70. The secondary of the isolation transformer may be communicatively coupled to a high input impedance transceiver 90. A second portion of the signal (referred to as Signal P and indicated by "P" in the figure), which is identical to the first portion at point A, will continue down the MV power line. At point B, a portion of Signal P will traverse through conductor 102 to the isolation transformer 70 and transceiver 90.

Thus, from point A, Signal Q will travel a distance d4 to arrive at the transceiver 90. In contrast, Signal P will travel a distance equal to the sum of distances d1, d2, and d3 from point A to arrive at the transceiver 90. Because the speed of signal propagation through each path is nearly identical, the longer path that Signal P must travel, in comparison to Signal Q, results in a delay in the arrival of Signal P at the receiver 20. Thus, Signal P will arrive at the receiver a time period T2 after Signal Q, where the time period T2 of the delay is based, at least in part, on the additional distance Signal P must travel to arrive at the receiver 20. As discussed above, if the delay period T2 is substantially equal to the time required for propagation of the signal a distance of a half of a wave length, the transceiver 90 may receive a differential voltage at its terminals substantially equal to twice Vs (at point A). Alternately, if the delay period T2 is substantially equal to the time required for propagation of the signal a distance of a quarter of a wave length, the transceiver 90 may receive a differential voltage at its terminals substantially equal to Vs multiplied by the square root of two (at point A). In other words, if the distance Signal P must travel from point A to the transceiver 90 approximates a quarter a wave length of the carrier signal greater than the distance Signal Q must travel, then the receiver may receive a voltage at its terminals substantially equal to Vs (at point A) multiplied by the square root of two. In an alternate embodiment, a pair of capacitors may be used to couple conductors 101 and 102 to transceiver 90 instead of a isolation transformer 70.

Depending on the various factors, including but not limited to the quantity of power line noise, sensitivity of the receiver, and power of the data signals, it may be possible to construct and install the coupler so that the distance Signal P must travel is less than one half or one quarter of a wavelength greater than the distance Signal Q must travel. In one example embodiment, the distance Signal P travels may be greater than the distance Signal Q travels preferably may be greater than five percent (5%), more preferably greater than seven and a half percent (7.5%), even more preferably greater than ten percent (10%), and still more preferably greater than twenty percent (20%) of the wavelength of a carrier frequency or of the lowest carrier frequency used to communicate the data signals.

Referring to FIG. 5, assuming d2 is approximately equal to distance d4, the signal path of Signal P may be greater than the signal path of Signal Q approximately by the sum of distances d1 and d3. So, in this representation of this embodiment, the closer that the sum of distances d3 and d1 is to one half of the wavelength of the carrier frequency, the lower the coupling loss may be.

For coupling of data signals onto the MV power line, the transceiver 90 will differentially transmit the data signals to the isolation transformer 70 resulting in a voltage Vin on the primary winding of the isolation transformer 70. The voltage Vin is conducted to the MV power line at connection points A and B. The data signals may travel from the isolation transformer along path P (i.e., conductor 102 and the MV power line) to point A. The signals from path P may be additive to the signals traveling along path Q, because the data signals are differentially transmitted from the isolation transformer to point A, but via different distances. Thus, the coupler 100 may provide a transmission upstream (left in FIG. 5). However, because the cumulative distance along path Q and the MV power to point B may approximate the distance along path P to point B, the differentially transmitted signals may add to approximately zero resulting in only very small transmission of power downstream (right in FIG. 5). Similarly, the data signals transmitted to the coupler 100 from the downstream direction (traveling from right to left in FIG. 5) may reach the terminals of transceiver 90 at approximately the same time so as not to create a voltage differential across the transceiver terminals. Thus, some embodiments of the coupler 100 of FIG. 5 may be considered a directional coupler for transmission and reception.

If one conductor is longer than the other, such as conductor 102, it may be desirable to attach the longer conductor to the power line away from the first conductor so that the longer conductor is elongated. If the longer conductor is coiled, folded, or similarly arranged, the self-inductance of the longer conductor may increase substantially, thereby increasing the transmission loss of the conductor (and coupling loss of the device), which in many cases may be undesirable.

As will be evident from the above description, the couplers of the above embodiments may not be voltage referenced to the MV conductor. Because the coupler may be surrounded by cable components which are at ground potential, the electronics and power supplies associated with the coupler (e.g., in the associated device components—modems, router, filters, amplifiers, processors and other signal processing circuitry of the backhaul device, bypass device, repeater or other device processing received and/or transmitted signals) do not have to be built to isolate the MV potential from earth ground or from the low voltage power lines (which may be connected to the customer premises), which greatly reduces the complexity and cost of such a system. In other words, the coupler of the present invention may provide electrical isolation from the power lines (due to the insulation provided by the URD cable) while facilitating data communications therewith.

In practice, a first coupler 100 may communicate with a second coupler 100 that is on the same MV phase conductor as the first coupler or on a different MV phase conductor (such as one of the other phase conductors, the neutral conductor, or a conductor of a different three phase conductor set). Thus, the present invention facilitates communicating across conductors as well as through a single conductor.

As discussed, the coupler 100 couples data signals (e.g., RF signals) to and/or from a power line, which, in the embodiment above, is a medium voltage power line. Other embodiments of the present invention may be used to couple signals to low voltage and/or high voltage power lines.

In addition to overhead power lines, the coupler 100 of the present invention also may be used to couple data signals to and/or from URD cables providing power. An embodiment for such an application may use the same, or different components, as any of the embodiments described above as will be understood to those skilled in the art. One example embodiment for coupling data signals to and from a URD MV cable includes those components shown in FIG. 3 that are between stem connectors 401. Thus, such an embodiment may include not the stem connectors 401, the connection leads 402, or the fuses 403. The common mode choke 160 may be omitted or placed elsewhere such as on the conductors connecting the metal braid 155 to the transformer 200. In addition, the neutral conductor that normally forms part of a URD cable may be extended outside and around magnetic core 111.

The coupler 100 may be located at any desired location to couple data signals to and/or from a power line, including at a backhaul point, at a repeater, or forming part of a transformer bypass device at a transformer. Such a bypass device may include one or more of a low voltage signal processing circuit (which may include a filter, amplifier, and other components) a low voltage modem, a processor and associated software, a router, a medium voltage modem, and medium voltage processing circuitry. Likewise, a backhaul device and repeater may include some subset of these components and/or other components.

In another example application, the data connections of a first coupler 100 and a second coupler 100 may coupled together to provide a passive (1) bypass around a power line communications obstacle such as a capacitor bank, transformer, power line discontinuity, or other obstacle, (2) link between different power line conductors (which may include an MV and a neutral conductor, two MV conductors, or an MV and an LV conductor). Alternately, the two coupler device may not be passive, but instead include a power supply and amplifiers (for amplifying the signals in both directions) and may further include (1) a fast switch for switching between the two amplifiers (to prevent a feedback loop in a time division multiplexed system), or (2) a pair of filters so that each amplifier amplifies signals in a different frequency range (e.g., such as in a frequency division multiplexed system).

OFDM, CDMA or other multi-carrier communication schemes may result in a coupling loss for the various carriers that is not constant throughout the frequency band of communications. However, the transmitted signal may be pre-emphasized and the received signal may be post-emphasized by a predetermined function by the transceiver in order to compensate for the non-linear loss of the coupler.

As will be evident to one skilled in the art, many of the components of the above embodiments may be omitted or modified in alternate embodiments. For example, instead of a tubular metal braid, another material, conductor, or item may be used to construct the coupling capacitors or other data coupler. In addition, the tubular metal braids, or other object, may not extend around the entire circumference of the URD cable.

Also, the data cable may connect the second winding of the transformer 200 to the data processing circuitry, which may include one or more of a filter, an amplifier, an isolator, a modem, a processor, and a data router. Such circuitry, as well as a repeater, bypass device, backhaul point, and system with which the present invention may be used is described in U.S. patent application Ser. No. 10/315,725 filed Mar. 28, 2005, entitled "Power Line Repeater System and Method," which is hereby incorporated by reference in its entirety. In addition, two or more couplers may be connected to a single communications device (e.g., such as a bypass device, backhaul device, or repeater) via a separate connector or via "Y" connector or other multi-port connection device. The couplers may be connected to separate MV power line conductors (or an MV power conductor and a neutral conductor) for differential transmission of the data signals down the plurality of conductors. Furthermore, two or communications devices (e.g., such as a bypass device, backhaul device, or repeater) may be connected to a single coupler via a "Y" connector or other multi-port connection device.

In addition, as will be evident to those skilled in the art, the number, placement, and size of the toroids used in the invention are a design choice. In addition, the material from which the toroids are formed may be material other than ferrite as will be understood to those skilled in the art. While toroids are used in the above embodiments, alternate embodiments may employ partial toroids such as a three quarter toroid, a half toroid, a toroid with a gap, or a non-toroid shaped core.

Finally, the embodiments of the present invention described herein include a semi-conductive jacket. However, some embodiments may not employ a semi-conductive jacket.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiments.

Obviously, numerous modifications and variations of the present invention are possible in light of the above teachings. It is therefore to be understood that within the scope of the appended claims, the invention may be practiced otherwise than as specifically described herein.

What is claimed is:

1. A device for communicating data signals with a power line, the device comprising:
   a transformer having a magnetic core, a first winding, and a second winding;
   wherein said first and second winding each have a first end and a second end;
   wherein said second winding is configured to be communicatively coupled to a communications device;
   wherein said first end of said first winding is configured to be communicatively coupled to the power line at a first location;
   wherein said second end of said first winding is configured to be communicatively coupled to the power line at a second location;
   wherein said first location and said second location are separated by a first distance that is greater than five percent of a wavelength of a carrier frequency used to communicate the data signals; and
   wherein data signals arriving at the first location via a first path that includes said first end of said first winding and via a second path that includes said second end of said first winding and the power line are additive for one or more carrier frequencies used to communicate the data signals.

2. The device of claim 1, wherein at least some of the data signals to be communicated are communicated via at least one carrier frequency greater than thirty megahertz.

3. The device of claim 2, wherein the first distance is greater than nineteen inches.

4. The device of claim 1, wherein said first distance is greater than ten percent of a wavelength of a carrier frequency used to communicate the data signals.

5. The device of claim 4, wherein the first distance is greater than thirty inches.

6. The device of claim 1, wherein said first distance is at least twenty percent of a wavelength of a carrier frequency used to communicate the data signals.

7. The device of claim 1, wherein said first end of said first winding is communicatively coupled to the power line via a first connection lead and said second end of said first winding is communicatively coupled to the power line via a second connection lead, and wherein said first and second connection leads traverse through a common mode choke.

8. The device of claim 1, wherein said first end of said first winding is communicatively coupled to the power line via a first fuse and said second end of said first winding is communicatively coupled to the power line via a second fuse.

9. The device of claim 8, wherein said first end of said first winding and said second end of said first winding are communicatively coupled to the power line through a common mode choke.

10. The device of claim 1, wherein said second winding is in communication with a data communication circuit comprised of a filter, an amplifier, and a modem.

11. The device of claim 1, wherein said first winding includes a length of underground residential distribution cable rated for voltages greater than one thousand voltages.

12. The device of claim 11, further comprising a conductive path between said second winding and a ground potential.

13. The device of claim 12, wherein said magnetic core is disposed substantially around the circumference of said second winding.

14. A method of using a device to communicate data signals over a power line, the device comprising a transformer comprising a magnetic core, a first winding, and a second winding, said first and second winding each having a first end and a second end, the method comprising:
communicatively coupling the second winding of the transformer to a communications device;
communicatively coupling the first end of said first winding to the power line at a first location;
communicatively coupling the second end of the first winding to the power line at a second location;
wherein the first location and the second location are separated by a first distance that is greater than five percent of a wavelength of a carrier frequency used to communicate the data signals; and
wherein data signals arriving at the first location via a first path that includes the first end of the first winding and via a second path that includes the second end of the first winding and the power line are additive for one or more carrier frequencies used to communicate the data signals.

15. The method of claim 14, wherein at least some of the data signals to be communicated are communicated via at least one carrier frequency greater than thirty megahertz.

16. The method of claim 15, wherein the first distance is greater than nineteen inches.

17. The method of claim 14, wherein the first distance is greater than ten percent of a wavelength of a carrier frequency used to communicate the data signals.

18. The method of claim 17, wherein the first distance is greater than thirty inches.

19. The method of claim 14, wherein the distance is at least twenty percent of a wavelength of a carrier frequency used to communicate the data signals.

20. The method of claim 14, wherein the first end of the first winding is communicatively coupled to the power line via a first connection lead and the second end of the first winding is communicatively coupled to the power line via a second connection lead, and wherein the first and second connection leads traverse through a common mode choke.

21. The method of claim 14, wherein the first end of the first winding is communicatively coupled to the power line via a first fuse and the second end of the first winding is communicatively coupled to the power line via a second fuse.

22. The method of claim 21, wherein the first end of the first winding and the second end of the first winding are communicatively coupled to the power line through a common mode choke.

23. The method of claim 14, wherein the second winding is in communication with a data communication circuit comprised of a filter, an amplifier, and a modem.

24. The method of claim 14, wherein the first winding includes a length of underground residential distribution cable rated for voltages greater than one thousand voltages.

25. The method of claim 24, wherein the cable further comprises a semi-conductive jacket and further comprising a low frequency conductive path between the semi-conductive jacket and ground.

26. The method of claim 14, further comprising a conductive path between the second winding and a ground potential.

27. A device for communicating data signals with a power line, the device comprising:
a first conductor having a first end and a second end;
a second conductor having a first end and a second end;
an insulator disposed between said first conductor and said second conductor;
a magnetic core disposed to be in communication with the magnetic flux of said second conductor and said first conductor;
said first end of said first conductor configured to be communicatively coupled to the power line at a first location and said second end of said first conductor is configured to be communicatively coupled to the power line at a second location;
said first end of said second conductor is configured to be communicatively coupled to a transceiver;
wherein said first location and said second location are separated by a first distance that is greater than five percent of a wavelength of a carrier frequency used to communicate the data signals; and
wherein data signals arriving at the first location via a first path that includes said first end of said first conductor and via a second path that includes said second end of said first conductor and the power line are additive for one or more carrier frequencies used to communicate the data signals.

28. The device of claim 27, further comprising a low frequency conductive path between said second conductor and a ground potential.

29. The device of claim 27, wherein said first end of said first conductor is communicatively coupled to the power line via a first fuse and said second end of said first conductor is communicatively coupled to the power line via a second fuse.

30. The device of claim 27, wherein said first end of said first conductor is communicatively coupled to the power line through a common mode choke and said second end of said first conductor is communicatively coupled to the power line through the common mode choke.

31. A method of communicating data on a power line, comprising:

conducting first voltage signals representing data from a first location along a first path to a first point on the power line, wherein the first path includes a first conductor;

conducting second voltage signals representing the data from a second location along a second path to the first point on the power line, wherein said second path includes a second conductor and a segment of the power line and wherein the second path is longer than said first path;

wherein the first voltage signal and the second voltage signal are substantially equal in magnitude and opposite in polarity at said first location and said second location; and wherein the first voltage signal and the second voltage signal are additive at the first point for one or more carrier frequencies used to communicate the data.

32. The method of claim 31, wherein said first conductor and said second conductor are substantially the same length.

33. The method of claim 31, wherein said second conductor is longer than said first conductor.

34. The method of claim 31, wherein said first conductor and said second conductor each includes a fuse.

35. The method of claim 31, wherein said first conductor and said second conductor traverse through a common mode choke.

* * * * *